March 19, 1929. B. G. GILBOUGH 1,705,758
SPRING LUBRICATING DEVICE
Filed Dec. 14, 1925
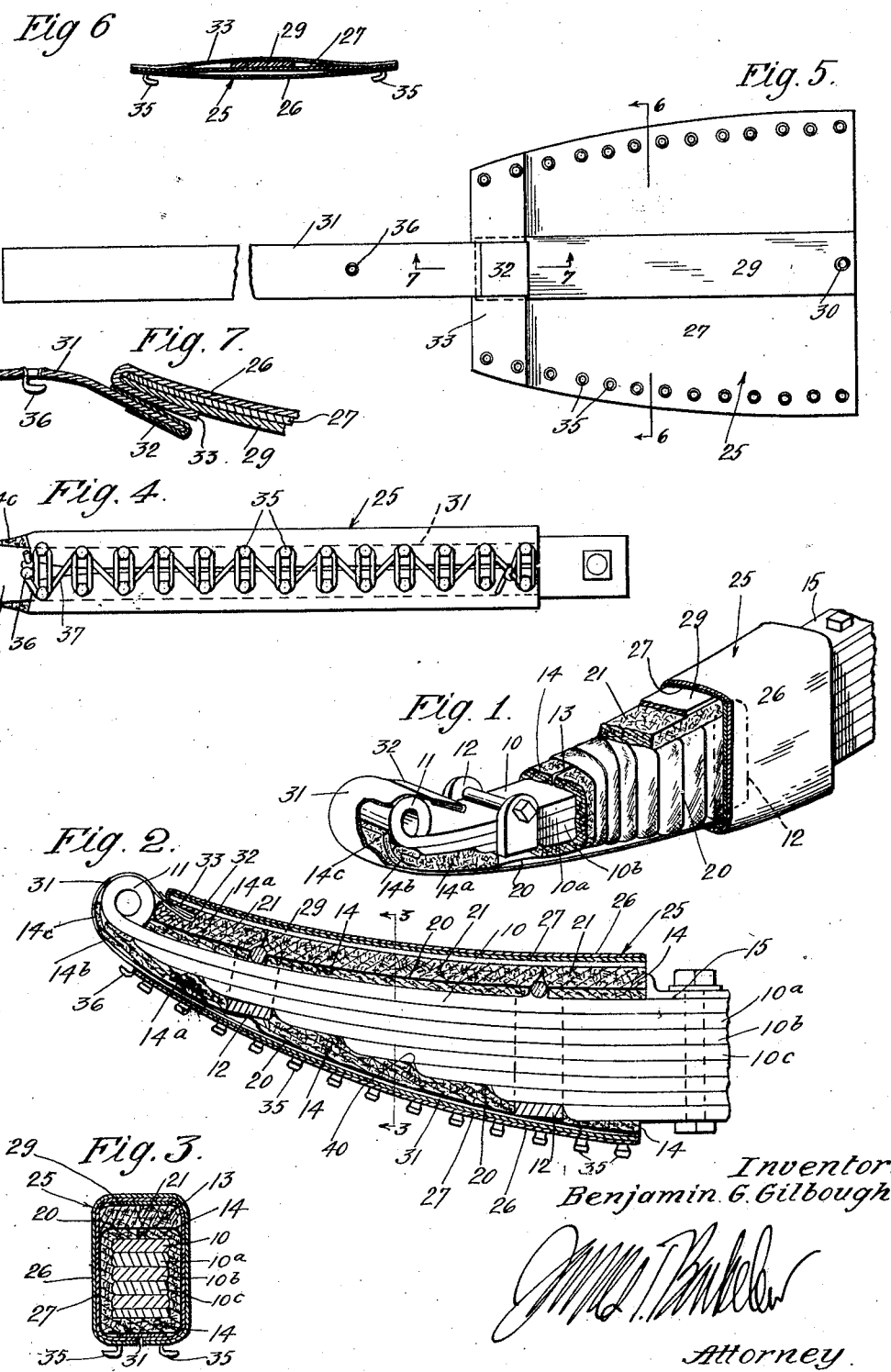
Inventor.
Benjamin G. Gilbough
Attorney.

Patented Mar. 19, 1929.

1,705,758

UNITED STATES PATENT OFFICE.

BENJAMIN G. GILBOUGH, OF LOS ANGELES, CALIFORNIA.

SPRING-LUBRICATING DEVICE.

Application filed December 14, 1925. Serial No. 75,218.

This invention has to do with lubrication of leaf springs such as are used in automobiles. The invention, however, is capable of lubricating a leaf spring regardless of the purpose of its use; but in giving a complete and explicit understanding of the invention, it will be best described as applied to an automobile suspension spring.

The objects and corresponding accomplishments of the invention will be best understood from the following detailed specifications wherein a preferred specific form of device illustrative of the invention is explained; but I may state preliminarily that it is a general object of the invention to provide a device that will at all times properly and fully lubricate a leaf spring; keeping a film of oil between the several leaves and excluding air and grit, dirt and dust, from between the leaves.

Great difficulty has heretofore been encountered in keeping automobile springs properly lubricated—in keeping an unbroken film of oil between all the leaves. This difficulty has been particularly experienced with relation to the outer parts of the spring where the movement of the spring as a whole, and the relative sliding movements of the leaves, are greatest. If an automobile spring be thoroughly cleaned and oiled, in a comparatively short period of use the oil films between the leaves are broken or are entirely forced out, the surfaces become dry of oil or become coated with road dust and the leaf ceases to function properly. When an automobile is running on the road, the springs are constantly in operation. Considering the spring of the most usual kind, for instance, the semi-elliptic spring that bows upwardly, the downward motion of the end of the spring causes the upper leaves to bear down on those immediately below and tends to squeeze out any fluid that is between their surfaces. On upward motion of the spring's ends there is a tendency to open up the spaces between adjacent leaves. Whenever these spaces are opened up, even slightly, air is drawn inwardly and fills the spaces. On such opening up of the spaces the oil that has been squeezed out is not drawn back into the spaces, because the oil is comparatively heavy and sluggish in its flow, whereas the atmospheric air, which is ever present at the sides of the spring, easily rushes in to fill the spaces. On the next compressive motion of the spring, when those spaces are closed down, the air is pushed out and the oil pushed out along with it. This action, kept up for a short time, virtually pumps the oil out from the spaces between the spring leaves, and soon the rubbing surfaces of the leaves are dry of oil, or, if any oil remains, it becomes filled with road dust which the air has carried in. It is a general object of this invention to overcome these difficulties, and in doing so I provide a lubricant-carrying jacket for the spring which entirely excludes air from access to the sides of the spring and the spaces between the leaves, and keeps ever present at the sides of the spring, and therefore at the edges of the inter-leaf spaces, a supply of lubricant. By so doing it is seen that upon each opening movement of the spring nothing but lubricant can be drawn into the interleaf spaces. As a consequence the inward flow of lubricant when the leaves are separated entirely offsets the outward flow when the leaves are compressed, and a constant unbroken film of lubricant is kept between the leaves.

There are various other objects and corresponding features of my invention, all of which will be best understood from the following specific detailed description of a preferred form of my device, and for this purpose I have reference to the accompanying drawings in which—

Fig. 1 is a fragmentary perspective showing my preferred construction;

Fig. 2 is a longitudinal section of the device shown in Fig. 1;

Fig. 3 is a cross-section on line 3—3 of Fig. 2;

Fig. 4 is a bottom plane of the device;

Fig. 5 is a plan showing the exterior cover opened out;

Fig. 6 is a detail section taken on line 6—6 of Fig. 5; and

Fig. 7 is a detail section on line 7—7 of Fig. 5.

In the drawings one-half of a typical semi-elliptic, or the whole of a quarter-elliptic spring is illustrated, comprising an uppermost leaf 10, and lower leaves $10^a$, $10^b$, etc.

The arrangement and disposition of these leaves is well known; the uppermost leaf usually has an eye 11 at its outer end, the next lower leaf 10$^a$ bears upwardly against the uppermost leaf and ends at a point somewhat short of the end of the uppermost leaf; the next leaf 10$^b$ bears upwardly against leaf 10$^a$ and ends at a point somewhat short of the end of leaf 10$^a$; and so on. These leaves are so formed that, when the spring is assembled, they bear against each other throughout their adjacent surfaces. Movement of eye 11 up and down causes the leaves to flatten and to bow upwardly; and causes relative movement of the leaves along their surfaces of contact. It is these surfaces of contact that must be lubricated. The difficulties of keeping these surfaces lubricated are enhanced by the fact that adjacent leaves do not bear on each other over their whole surfaces, as the surfaces are not absolutely true; and also that the under leaves are made with greater curvature than the upper ones, so that when the leaves tend to spread apart, the spreading tendency is augmented at medial points of the leaves. To prevent entry of air or dirt to the spaces thus ever present in the spring, it is necessary not only to exclude air but also to keep these spaces filled with lubricant.

I place first around the entire spring an envelope of some suitable lubricant holding material, such as heavy felt. This felt inner covering is formed in sections 14 cut to fit around the spring between the spring clips 12; and, as is best shown in Figs. 1 and 2, I may preferably cut and fit these felt sections so that each section extends under the spring, up along the sides, and its edges meet at 13 at the center of the top. Such sections are shown at 14 in Figures 1, 2 and 3. The lower part 14$^a$ of the outermost felt section (the part that extends from outermost clip 12 to and somewhat around eye 11) may be split and partly doubled back as shown at 14$^b$, so as to fill the space immediately under eye 11 beyond the outermost end of leaf 10$^a$, while the other portion of the split part is continued on up around eye 11, as shown at 14$^c$. The upper part of the outermost felt section 14$^a$ extends out to the eye 11, as is clearly shown in Fig. 2. At or near the center of the spring the felt covering is continued as far as it may be, consistent with the central mounting of the spring. For instance, the upper felt part 13 may be abutted at its end against the plate 15 that holds the spring in place.

This inner felt covering that is first applied to the spring is preferably comparatively heavy, is selected for its capacity to hold a proper lubricant, such as an oil or light grease, and is tightly bound in place about the spring so as to exclude all air from the spring and fit around the spring as closely as may be. At the under side of the spring the felts 14 are compressed more or less into the spaces immediately outside the ends of the several leaves, so that even the end of each leaf, as well at its side edge, is closely covered by the impregnated felt and air is prevented from entering endwise between the leaves as well as prevented from entering at the sides. If any spaces at all are left at the leaf ends (as indicated at 40 in Fig. 2) they are so small that they become filled with the lubricant which, as I afterwards point out, stands in the felt at at a substantial height above all the leaf ends. The same situation obtains along the sides of the spring. The edge of most spring leaves are somewhat rounded, leaving slight grooves along the sides of the spring instead of making the spring have an absolutely flat side surface (see Fig. 3). The felts are pressed into these grooves sufficiently to exclude air; or, if the grooves are not completely felt-filled, the small remaining spaces are filled with the oil film.

The binding for the inner felt covering may preferably be a taping of some suitable fabric. For instance, a substantially strong cotton fabric strip may be taped about the inner felt covering, as indicated at 20; and this taping preferably is extended continuously over the spring clips 12 as well as over and around the inner felt covering. The taping is put on comparatively tightly so as to bind the felt tightly against the spring leaves, and particularly so as to bind the felt covering tightly against the sides of the spring and thus against the edges of the leaves; and, if anything, the taping is put on more tightly at and near the outer end of the spring (the end near eye 11) than it is at other places. Near the center of the spring there is comparatively little sliding movement between adjacent leaves; and comparatively little separating movement, and therefore comparatively little tendency to squeeze or pump the lubricant out and to draw air in. But, further out along the spring the relative separating movement is much larger; there is more tendency to squeeze the oil out and draw the air in; while at the extreme outer ends the sliding movement is at a maximum; and therefore in applying my device I take particular care that the inner felt covering be tightly pressed around the outer parts of the spring.

On the usual spring the thickness of the inner felt covering will form a substantially smooth contour with the lower ends of spring clips 12; but the spring clips 12 usually project more above the spring. I therefore put in filler blocks or pads 21 of felt, as indicated in the drawings, between the spring clips, so as to make a fairly smooth upper contour to be covered by the outermost cover. These felt pads 21 will also, in practice, carry oil, although it is not necessary that they should. These pads can be made of material that is not necessarily oil absorbent; but it is preferable that they also be capable of carrying oil because they form in effect reservoirs that will supply oil to the inner felt covering.

Around the whole assembly thus far described I place an outer cover 25 preferably having a fluid-proof outer surface. I prefer to make this outer cover of two thicknesses of suitable fluid-proofed fabrics. The outer thickness 26 may be of fluid-proof fabric such as imitation leather. The inner thickness 27 is preferaly of strong canvas; which may be also fluid-proofed; and these two thicknesses are secured together along their edges in some suitable manner, as for instance by the rivets of the lacing hooks 35. The inner fabric 27 is made of lesser width between the stitchings, than the outer thickness, so that when this outer cover is wrapped around the assembly the inner stout canvas will take the strain off the outer cover. At the same time the difference in width of the two thicknesses is such that when the covering is put into place around the spring, the outer thickness will be drawn smooth. Also a stiffening strip 29 is secured to the inner face of the cover, being secured to the fabric of the cover at one end by a suitable rivet 30, the other end being left loose, under fold 33, to adjust itself.

This stiffening strip 29 is a heavy piece of stiffened fabric and its function is merely to give a smooth contour to the upper surface of the finally assembled device.

A tongue 31, being a long strip of fluid-proof fabric has at its end a metal clip 32, and this metal clip lies under the turned portion 33 of the outer thickness 26 of cover 25. The tongue is thus down in position behind eye 11 and held from moving endwise. The tongue extends around eye 11 and then extends inwardly along the bottom of the inner felt covering, this tongue being of fairly stiff material, so that it gives a smooth lower contour to the completed assembly; and it also closes the gap that would otherwise exist between the longitudinal edges of the outer covering. The outer covering is provided along its edges with lacing hooks 35; and tongue 31 is also provided with a lacing hook 36 in about the position illustrated. The lacing 37 is started at hook 36 in about the position illustrated and is then laced around hook 35 in such a manner as to make transverse loops between opposite hooks 35. By thus lacing the cover it is drawn tightly around the whole inner assembly, and tongue 31 is also drawn tightly into position around eye 11 and against the end 14ᶜ of the inner covering so as to hold that end up tightly against eye 11 and at a substantial elevation above the outermost end of spring leaf 10ª. Tongue 31 extends the whole length of the underside of exterior cover 25, as is illustrated in Figs. 2 and 4. By thus securing the tongue, it or its end portion can be easily removed and replaced in case of breakage without the necessity of removing the whole cover, but by only loosening the outer end parts of the outer cover.

In assembling the device about a spring the several felts are preferably first impregnated with lubricant and then the assembly is made as described. The inner lubricant-impregnated felt covering is held closely against and around the spring and particularly is held closely against the sides of the spring, and therefore held closely to the edges of the leaves. The wrapping or taping 20 of course also becomes impregnated with lubricant, and it, together with the impregnated felts, also prevents air entrance to the spring. Theoretically, of course, air might be thought to have entry at the inner and outer ends of the completed covering. But although some air may enter at the ends, in practice I find that so little air there has access to the spring that it is of no consequence. At the inner end of the wrapping, near the center of the spring, although air may enter endwise, it will be remembered that at that point there is very little relative movement between the spring leaves and that therefore the presence of air at the extreme end is of little or no consequence. However, the air that enters at that end is cut off from travelling any distance longitudinally along the spring inside the covering, because the covering is held tightly against the spring and a continuous oil film is always present between the covering and the spring, due to the fact that the felts are impregnated with oil. The same is true at the outer end. Although the spring eye 11 is not completely enclosed, not being covered at the ends of the eye, yet air that is there present cannot travel inwardly longitudinally along the spring past the eye, because the lubricant impregnated felt coverings are tightly pressed against the spring and thus, with their oil films, seal the spring against air entry.

As the spring operates, and the spaces between the leaves are opened and closed, the ever present surrounding film of oil keeps the contacting spring leaf surfaces constantly supplied with oil films, as the oil is as much drawn in on opening action as it is forced out on closing action. Furthermore, it is to be noted that the end portions 14ᵇ and 14ᶜ of inner felt are held at an elevation above the outermost end of spring leaf 10ª. The lubricant carried by these felt ends always has a gravitational tendency to run down, and by so doing this lubricant keeps the rubbing surfaces at the ends of the longest leaves thoroughly lubricated. These are the surfaces at which the greatest movement takes place.

When it is necessary for any reason to supply new lubricant to my device it is not necessary to remove it from the spring. A grease or oil gun, commonly known as a "hypodermic", is inserted at the ends of eye 11, being pushed in under the inner felt covering, and the lubricant is forced into the felt at that point. That is normally the only point at which the felt will require an additional supply of lubricant from time to time, as that is the place where lubricant is mostly used. Also the lubricant has a tendency, if anything, to run from the high outer end of the spring toward the lower central portions of the spring. Thus it is only necessary that the user, by an occasional injection of lubricant, see to it that the outer end of the inner felt covering is properly supplied with lubricant.

It will be understood that although I have described the device as applied only to one-half of a typical semi-elliptic spring, a complete installation contemplates a similar and substantially duplicate application to the whole of each spring of an automobile. The specific arrangement may of course vary with the exact shape and disposition of the different springs; but the device as above described may be taken as typical.

I wish shortly to call to attention the accomplishments of my device. As I have said, it excludes air and dirt and keeps the spaces between leaves constantly full of clean lubricant. Thus the actual sliding surfaces are always supplied with lubricant and those surfaces are not, as usual, rubbed or ground down by grit, but are evenly polished down to make good bearing surfaces. Under ordinary conditions, the initially contacting faces in a spring are soon ground down so as to greatly reduce the bearing area. In my device the initial bearing surfaces polish down and greatly increase both their area and their qualities.

Although I have described in specific detail a preferred form of device embodying my invention, I have done so in order that the invention itself may be thoroughly and completely understood, and not for the purpose of limiting the invention to the specific form, arrangement and structure herein set forth. Various modifications will suggest themselves to those skilled in this art; and I therefore wish it understood that the invention is not limited except as expressly so stated in the following claims.

I claim:

1. In a lubricator and covering for a leaf spring, an inner sheathing of lubricant-impregnated material pressed tightly against the edges of the leaves, an end portion of said sheathing extending beyond and to an elevation above the ends of the longer leaves of the spring, so that the lubricant has a tendency to gravitate from the end portion of the sheathing toward the end portions of said leaves, a binding around the inner sheathing binding it tightly against the sides of the spring, said binding being of a material capable of being impregnated with lubricant; and an exterior covering surrounding the binding and embodying a fluid-proof layer and also a tongue extending around and under the elevated end portion of the inner sheathing to hold that end portion at its proper elevation against the spring.

2. In a lubricator and covering for a leaf spring, an inner sheathing of lubricant-impregnated material pressed tightly against the edges of the leaves, an end portion of said sheathing extending beyond and to an elevation above the ends of the longer leaves of the spring, so that the lubricant has a tendency to gravitate from the end portion of the sheathing toward the end portions of said leaves, a binding around the inner sheathing binding it tightly against the sides of the spring, said binding being of a material capable of being impregnated with lubricant; and an exterior covering surrounding the binding and embodying a fluid-proof layer and also a tongue extending around and under the elevated end portion of the inner sheathing to hold that end portion at its proper elevation against the spring, said tongue being mechanically connected with the exterior cover layer at one end and extending around the end of the spring, said exterior cover being provided with lacing means, and the tongue being provided with a lacing hook whereby the tongue may be held tightly around the end of a spring.

3. In a lubricator and covering for a leaf spring, an inner sheathing of lubricant-impregnated material pressed tightly against the edges of the leaves, an end portion of said sheathing extending beyond and to an elevation above the ends of the longer leaves of the spring, so that the lubricant has a tendency to gravitate from the end portion of the sheathing toward the end portions of said leaves, a binding around the inner sheathing binding it tightly against the sides of the spring, said binding being of a material capable of being impregnated with lubricant, a padding of lubricant impregnated material resting on the upper side of said binding, and extending substantially from end to end thereof, and an exterior cover surrounding said binding and padding.

4. An exterior covering for a leaf spring, comprising an outer layer of fluid-proof material, an inner strain-taking layer stitched at its edges to the outer layer, the inner layer being of less dimensions than the outer layer so that when the cover is placed tightly around the spring the inner layer will take the mechanical strain off the outer layer.

5. An exterior covering for a leaf spring, comprising an outer cover layer of fluid-proof material, an inner strain-taking layer stitched at its edges to the outer layer, the inner layer being of less dimensions than the outer layer so that when the cover is placed tightly around the spring the inner layer will take the mechanical strain off the outer layer, the cover being provided at its longitudinal edges with lacing means whereby said longitudinal edges may be drawn together, a longitudinal stiffening member attached to the inner layer along its center, and a tongue attached at its end to an end of the cover and adapted to be passed around the end of the spring and to close the gap between the laced edges of the cover, said tongue being provided with a lace hook whereby it may be drawn and held tightly around the end of the spring.

6. An exterior covering for a leaf spring, comprising a flexible member adapted to be folded about the spring with opposite edges meeting and bound together, and a tongue having one end inserted under an edge of the cover at the side of the spring opposite the meeting edges, the tongue extending over and around the end of the spring and extending thence lengthwise under the meeting edges to close the gap between them.

7. In a lubricator and covering for a leaf spring, an inner sheathing of lubricant impregnated material pressed tightly against the edges of the leaves, a binding around the inner sheathing binding it tightly against the sides of the spring, said binding being of a lubricant-pervious material, a padding of lubricant impregnated material resting on the upper side of the binding and extending substantially from end to end thereof, and an exterior cover of lubricant-impervious material surrounding said binding and padding.

8. An exterior covering for a leaf spring, comprising a flexible member adapted to be folded about the spring with opposite edges meeting and bound together, and a tongue having one end attached at an edge of the cover at the side of the spring opposite the meeting edges, the tongue extending over and around the end of the spring and extending thence lengthwise along the meeting edges to close the gap between them, and means for securing the tongue in place.

In witness that I claim the foregoing I have hereunto subscribed my name this 3d day of December, 1925.

BENJAMIN G. GILBOUGH.